United States Patent
Harada et al.

(10) Patent No.: US 12,022,445 B2
(45) Date of Patent: Jun. 25, 2024

(54) RADIO COMMUNICATION NODE THAT HAS A FIRST RADIO LINK WITH A PARENT NODE AND A SECOND RADIO LINK WITH A CHILD NODE, AND CORRESPONDING COMMUNICATION METHOD

(71) Applicant: NTT DOCOMO, INC., Tokyo (JP)

(72) Inventors: Hiroki Harada, Tokyo (JP); Daisuke Kurita, Tokyo (JP); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 384 days.

(21) Appl. No.: 17/604,218

(22) PCT Filed: Apr. 26, 2019

(86) PCT No.: PCT/JP2019/018162
§ 371 (c)(1),
(2) Date: Oct. 15, 2021

(87) PCT Pub. No.: WO2020/217540
PCT Pub. Date: Oct. 29, 2020

(65) Prior Publication Data
US 2022/0201681 A1    Jun. 23, 2022

(51) Int. Cl.
*H04W 72/04* (2023.01)
*H04W 72/0446* (2023.01)
*H04W 72/23* (2023.01)
*H04W 88/08* (2009.01)
*H04W 92/10* (2009.01)
*H04W 92/20* (2009.01)

(52) U.S. Cl.
CPC ....... *H04W 72/0446* (2013.01); *H04W 72/23* (2023.01); *H04W 88/08* (2013.01); *H04W 92/10* (2013.01); *H04W 92/20* (2013.01)

(58) Field of Classification Search
CPC . H04W 72/0446; H04W 72/23; H04W 88/08; H04W 92/10; H04W 92/20; H04W 72/044; H04L 45/04; H04L 63/028
See application file for complete search history.

(56) References Cited

U.S. PATENT DOCUMENTS

| | | | |
|---|---|---|---|
| 9,729,295 B2 * | 8/2017 | Zhang | H04L 1/1861 |
| 11,638,246 B2 * | 4/2023 | Hamidi-Sepehr | H04W 72/23 370/329 |
| 2021/0045105 A1 * | 2/2021 | Yoon | H04L 1/1864 |

OTHER PUBLICATIONS

Office Action issued in the counterpart Japanese Patent Application No. 2021-515763, mailed on Apr. 20, 2023 (6 pages).
International Search Report issued in PCT/JP2019/018162 on Jun. 4, 2019 (2 pages).

(Continued)

*Primary Examiner* — Wei Zhao
(74) *Attorney, Agent, or Firm* — Osha Bergman Watanabe & Burton LLP

(57) ABSTRACT

A radio communication node sets a radio backhaul link with a parent node and a radio access link with a child node. The radio communication node receives control information of the radio access link, and determines location that indicates a radio resource available to the radio access based on a reception timing of the control information in a slot of a radio frame.

5 Claims, 12 Drawing Sheets

(56) References Cited

OTHER PUBLICATIONS

Written Opinion of the International Searching Authority issued in PCT/JP2019/018162 on Jun. 4, 2019 (4 pages).
3GPP TR 38.874 V16.0.0; "3rd Generation Partnership Project; Technical Specification Group Radio Access Network; NR; Study on Integrated Access and Backhaul; (Release 16)"; Dec. 2018 (111 pages).
3GPP TSG RAN WG1 Meeting #96bis; R1-1905006 "Updated IAB resource management framework" Qualcomm Incorporated; Xi'an, China; Apr. 8-12, 2019 (8 pages).
3GPP TSG RAN WG1 Meeting #94bis; R1-1811258 "Resource Management in IAB Network" Qualcomm Incorporated; Chengdu, China; Oct. 8-12, 2018 (8 pages).
3GPP TSG RAN WG1 Meeting #94bis; R1-1810130 "Physical layer design for NR IAB" Huawei, HiSilicon; Chengdu, China; Oct. 8-12, 2018 (18 pages).
Extended European Search Report issued in European Application No. 19925602.5, dated Oct. 12, 2022 (10 pages).

\* cited by examiner

RADIO COMMUNICATION NODE THAT HAS A FIRST RADIO LINK WITH A PARENT NODE AND A SECOND RADIO LINK WITH A CHILD NODE, AND CORRESPONDING COMMUNICATION METHOD

TECHNICAL FIELD

The present invention relates to a radio communication node that is capable of setting a radio access and a radio backhaul.

BACKGROUND ART

3rd Generation Partnership Project (3GPP) specifies Long Term Evolution (LTE), and with the aim of further speeding, specifies LTE-Advanced (hereinbelow, the LTE includes the LTE-Advanced). Moreover, in the 3GPP, further, specification of a succeeding system of the LTE called 5G New Radio (NR) or Next Generation (NG) and the like is being considered.

For example, in a radio access network (RAN) of the NR, an Integrated Access and a Backhaul (IAB) in which a radio access to a user equipment (UE) and a radio backhaul set between radio communication nodes such as radio base stations (gNBs) are integrated is being studied (Non-Patent Document 1).

In the IAB, the radio communication node includes Mobile Termination (MT) function for connecting to a parent node, and a Distributed Unit (DU) function for connecting to a child node or the UE.

Moreover, in the IAB, even if there is a restriction of half duplex communication, radio resources shared based on time division multiplexing (TDM), frequency division multiplexing (FDM), and space division multiplexing (SDM) are available via the radio access and the radio backhaul. Among such resources, from the DU's perspective, downlink (DL), uplink (UL), and Flexible time-resource are either hard resources or soft resources.

Specifically, the "hard" radio resource is a radio resource that is always available for a DU child link via which a corresponding time resource is connected to a child node or the UE, and the "soft" radio resource is a radio resource in which the availability thereof for the DU child link of the corresponding time resource is explicitly or implicitly controlled by the parent node.

PRIOR ART DOCUMENT

Non-Patent Document

Non-Patent Document 1: 3GPP TR 38.874 V16.0.0, 3rd Generation Partnership Project; Technical Specification Group Radio Access Network; NR; Study on Integrated Access and Backhaul; (Release 16), 3GPP, December 2018

SUMMARY OF THE INVENTION

As explained above, because availability of a radio resource belonging to a "soft" category to a child node can be changed dynamically depending on time, the child node needs an instruction via an explicit or implicit control information from a parent node.

To solve the problem, application of a same configuration as that of the conventional downlink control information (DCI) can be considered. However, even if the conventional DCI mechanism is simply applied, it is difficult for the child node to autonomously determine contents of the control information such as a transmission start timing (starting slot) or information quantity (number of transmission slots) of the control information transmitted from the parent node.

The present invention has been made in view of the above circumstances. One object of the present invention is to provide a radio communication node that can reliably set a radio access or a radio backhaul based on control information received from a parent node in Integrated Access and Backhaul (IAB) in which the radio access and the radio backhaul are integrated.

According to one aspect of the present invention a radio communication node (for example, radio communication node 100B) sets a first radio link (radio backhaul link L1) with a parent node (radio communication node 100A) and a second radio link (radio access link L2) with a child node (UE 200). The radio communication node includes a receiving unit (control signal processing unit 140) that receives control information of the second radio link; and a controlling unit (controlling unit 180) that determines location that indicates a radio resource available to the second radio link based on a reception timing of the control information in a slot of a radio frame.

According to another aspect of the present invention a radio communication node (for example, radio communication node 100B) sets a first radio link (radio backhaul link L1) with a parent node (radio communication node 100A) and a second radio link (radio access link L2) with a child node (UE 200). The radio communication node includes a receiving unit (control signal processing unit 140) that receives signaling that includes information of a radio resource available for the second radio link; and a controlling unit (controlling unit 180) that determines, based on the signaling, a slot on a radio frame that indicates the radio resource available for the second radio link.

MODES FOR CARRYING OUT THE INVENTION

Figure 1:
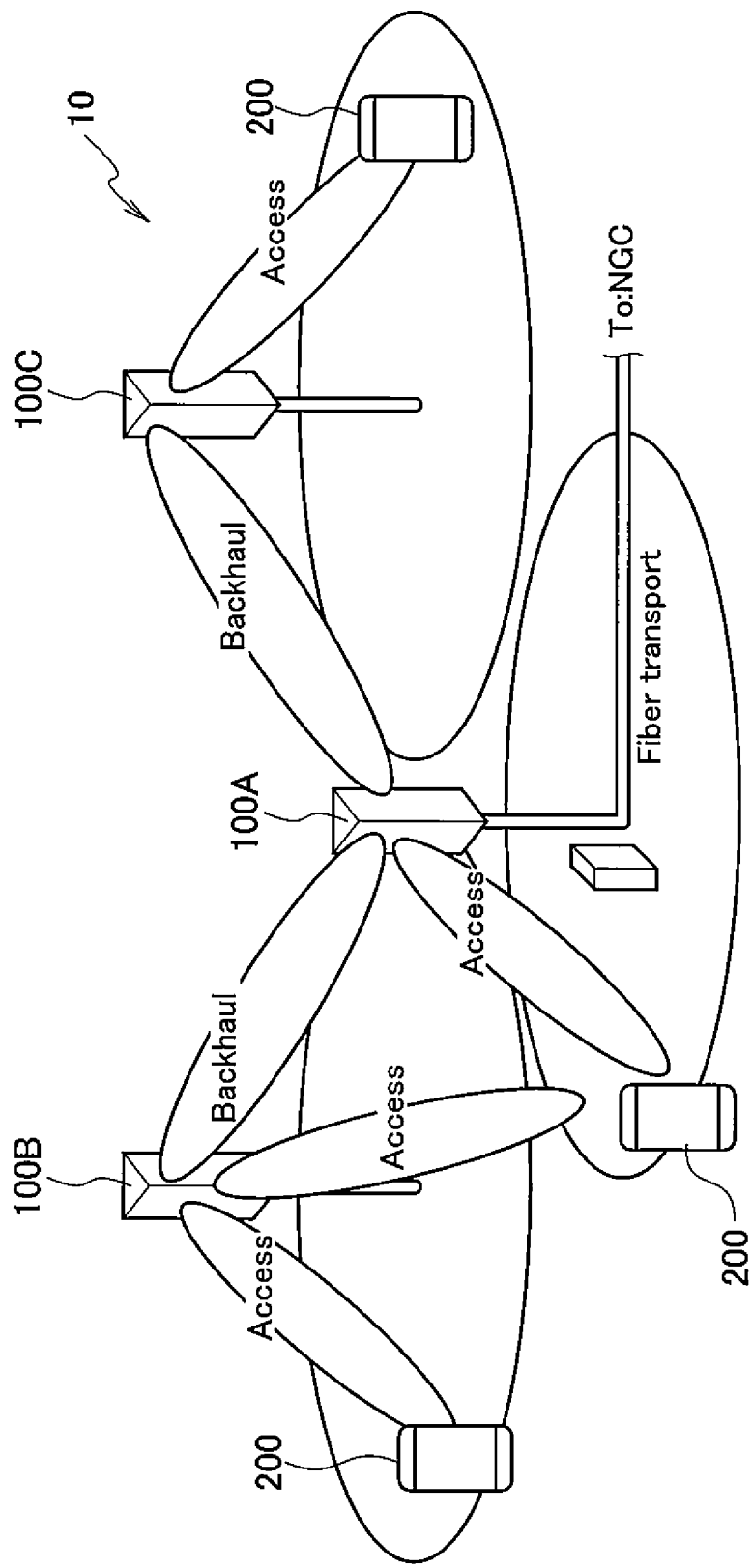
FIG. 1 is an overall structural diagram of a radio communication system 10.

Exemplary embodiments of the present invention are explained below with reference to the accompanying drawings. Note that, the same or similar reference numerals have been attached to the same functions and configurations, and the description thereof is appropriately omitted.

(1) Overall Structural Configuration of Radio Communication System

FIG. 1 is an overall structural diagram of a radio communication system 10 according to the present embodiment. The radio communication system 10 is a radio communication system using 5G New Radio (NR), and is constituted by a plurality of radio communication nodes and a user equipment.

Specifically, the radio communication system 10 includes radio communication nodes 100A, 100B, and 100C, and a user equipment 200 (hereinafter, "UE 200").

The radio communication nodes 100A, 100B, and 100C are capable of setting a radio access with the UE 200 and a radio backhaul between the radio communication nodes. Specifically, a backhaul using a radio link (transmission path) is set between the radio communication node 100A and the radio communication node 100B, and between the radio communication node 100A and the radio communication node 100C.

Accordingly, a configuration in which the radio access to the UE 200 and the radio backhaul between the radio communication nodes are integrated is called Integrated Access and Backhaul (IAB).

In the IAB, the existing functions and interfaces defined for the radio access are reused. Particularly, the Mobile-Termination (MT), gNB-DU (Distributed Unit), gNB-CU (Central Unit), User Plane Function (UPF), Access and Mobility Management Function (AMF), and a Session Management Function (SMF), along with their corresponding interfaces, for example, NR Uu (between MT and gNB/DU), F1, NG, X2, and N4 are used as a baseline.

In the present embodiment, the radio communication node 100A constitutes a parent node (and a donor node) in the IAB, and the radio communication node 100B and the radio communication node 100C constitute a child node in the IAB. The radio communication node 100A is connected to Next Generation Core (NGC), which is a core network of the NR, via a wired transmission path such as a fiber transport.

Figure 2:
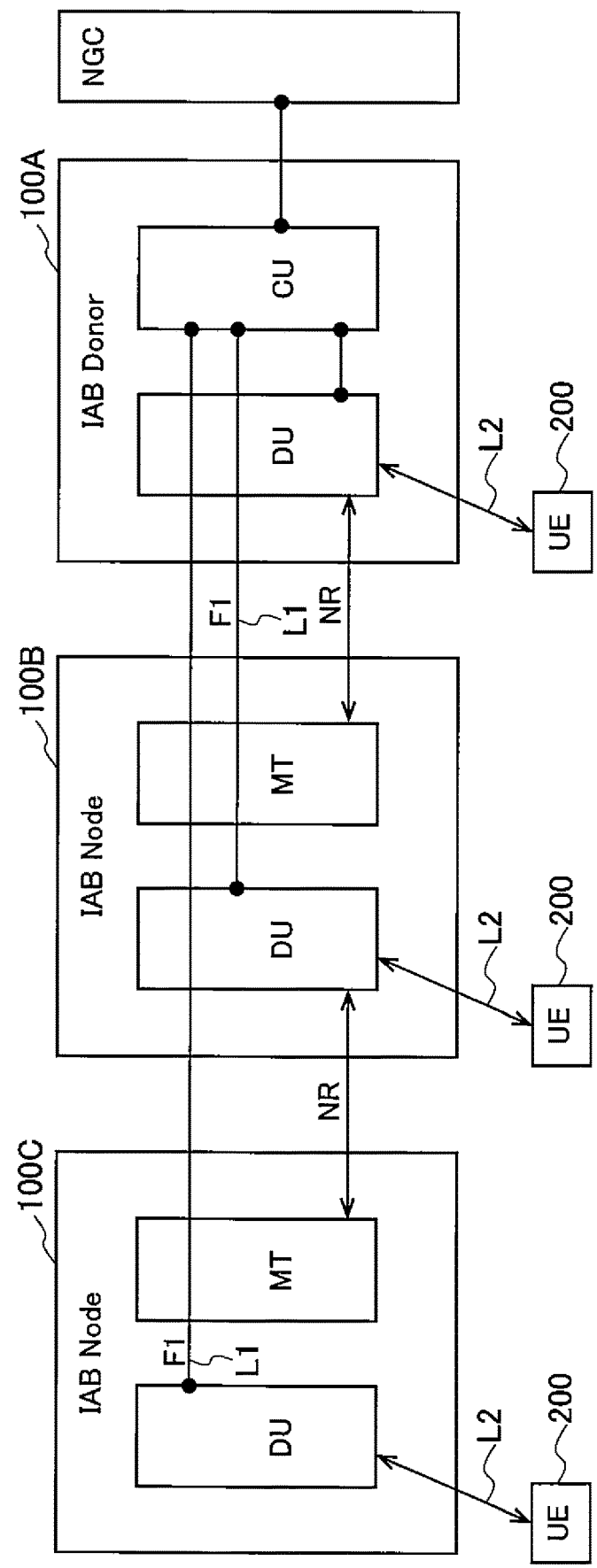
FIG. 2 shows a basic configuration example of IAB.

FIG. 2 shows a basic configuration example of the IAB. As shown in FIG. 2, the radio communication node 100A is connected to the NGC and constitutes the IAB donor node. An IAB donor node is a RAN node that provides an interface of the UE 200 to the core network (NGC) and a radio backhaul function to the IAB nodes (radio communication nodes 100B and 100C).

The radio communication nodes 100B and 100C are connected to the radio communication node 100A. Specifically, the radio communication node 100B and the radio communication node 100C are connected to the radio communication node 100A via a radio backhaul link L1.

The radio communication node 100B and 100C include the Mobile Termination (MT) function required to connect to the parent node, and the Distributed Unit (DU) function required to connect to the child node or the UE 200. Moreover, each radio communication node is connected to other nodes via the NR (Uu).

The radio communication node 100B and the radio communication node 100C constitute the IAB nodes. The IAB node is a RAN node capable of supporting the radio access with the UE 200 and backhauls access traffic by using radio. The radio communication node 100A, too, can support the radio access with the UE 200.

Specifically, the radio communication nodes 100A, 100B, and 100C are connected to the UE 200 via a radio access link L2.

The configuration example of the IAB shown in FIG. 2 uses CU/DU division; however, the IAB configuration need not necessarily be limited to such a configuration. For example, in the radio backhaul, the IAB can be constituted by a tunneling that uses GPRS Tunneling Protocol (GTP)-U/User Datagram Protocol (UDP)/Internet Protocol (IP).

The main advantage of such IAB configuration is that NR cells can be flexibly and densely arranged without increasing the density of the transport network. The IAB can be applied to various scenarios, such as arrangement of small cell outdoors, and support for indoor and mobile relays (for example, in buses and trains).

Even if the radio resource used for the radio access and the radio backhaul are limited to half-duplex communication, the time division multiplexing (TDM), the frequency division multiplexing (FDM), and the space division multiplexing (SDM) can be used. However, the radio resource need not necessarily be limited to half-duplex communication and can use full-duplex communication as long as other requirements are satisfied.

Moreover, as shown in FIGS. 1 and 2, the IAB can support deployment in a standalone (SA) mode of NR only or a non-standalone (NSA) mode that includes other RATS (LTE and the like).

(2) Functional Block Configuration of Radio Communication System

A functional block configuration of the radio communication nodes 100A, 100B, and 100C that constitute the radio communication system 10 will be explained below.

Figure 3:
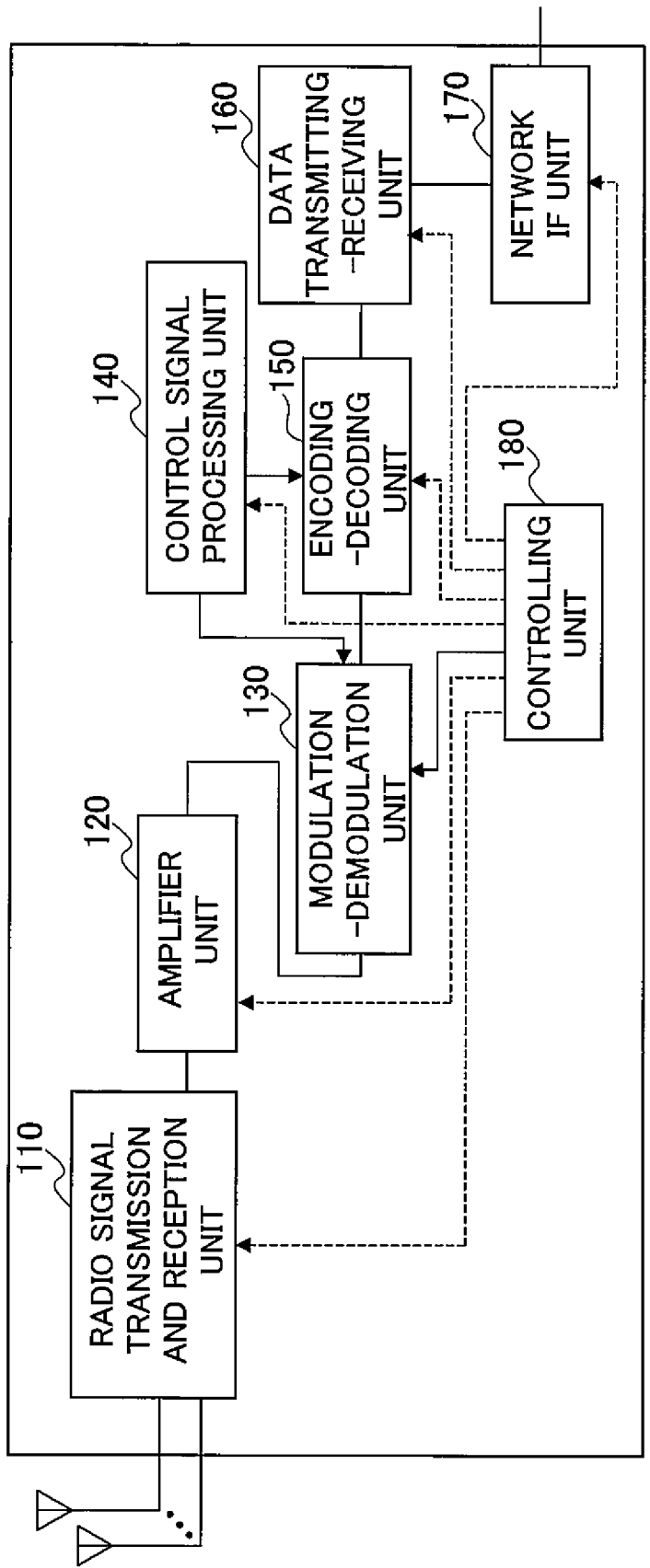
FIG. 3 is a functional block diagram of radio communication nodes 100A, 100B, and 100C.

FIG. 3 is a functional block diagram of the radio communication nodes 100A, 100B, and 100C. Furthermore, because the radio communication node 100A functions as the parent node (IAB donor node), the radio communication node 100A differs from the radio communication nodes 100B and 100C that function as the child nodes (IAB nodes).

In the following explanation, the radio communication node 100B is used as an example.

As shown in FIG. 3, the radio communication node 100B includes a radio signal transmission and reception unit 110, an amplifier unit 120, a modulation-demodulation unit 130, a control signal processing unit 140, an encoding-decoding unit 150, a data transmitting-receiving unit 160, a network IF unit 170, and a controlling unit 180.

Note that, in FIG. 3, only main functional blocks related to the explanation of embodiments are shown, and the radio communication node 100B may include other functional blocks (for example, a power supply unit and the like). Moreover, because FIG. 3 shows only a functional block configuration of the radio communication node 100B, see FIG. 18 for the hardware configuration.

The radio signal transmission and reception unit 110 transmits and receives a radio signal according to the NR system. By controlling radio (RF) signal transmitted from a plurality of antenna elements, the radio signal transmission and reception unit 110 supports technologies such as Massive MIMO that generates a beam having higher directivity, Carrier Aggregation (CA) that uses a plurality of component carriers (CC), and Dual Connectivity (DC) that simultaneously transmits the component carriers between a plurality of NG-RAN Nodes and UE.

The amplifier unit 120 is constituted by PA (Power Amplifier)/LNA (Low Noise Amplifier) and the like. The amplifier unit 120 amplifies the signal that is output from the modulation-demodulation unit 130 to a predetermined power level. Moreover, the amplifier unit 120 amplifies the RF signal output from the radio signal transmission and reception unit 110.

The modulation-demodulation unit 130 performs data modulation/demodulation, transmission power setting, resource block allocation, and the like for each predetermined communication destination (radio communication node 100A or UE 200).

As explained above, the radio communication node 100B sets the radio backhaul link L1 (first radio link) with the radio communication node 100A (parent node). Specifically, the radio communication node 100B sets the radio backhaul link L1 (see FIG. 2) by using the radio signal transmission and reception unit 110, the amplifier unit 120, the modulation-demodulation unit 130, and the like.

Moreover, the radio communication node 100B sets the radio access link L2 (second radio link) with the UE 200 (child node). Specifically, the radio communication node 100B sets the radio access link L2 (see FIG. 2) by using the radio signal transmission and reception unit 110, the amplifier unit 120, the modulation-demodulation unit 130, and the like.

Furthermore, in the case of the radio communication node 100B, the UE 200 becomes a child node, whereas in the case of the radio communication node 100A, the radio communication node 100B and the radio communication node 100C become the child nodes. In other words, either a user equipment or a radio communication node (IAB node) can act as a child node.

The control signal processing unit 140 executes processing related to various control signals transmitted and received by the radio communication node 100B. Specifically, the control signal processing unit 140 receives via a predetermined control channel the various control signals that are transmitted from the radio communication node 100A and the UE 200. Moreover, the control signal processing unit 140 transmits various control signals toward the radio communication node 100A or the UE 200 via a predetermined control channel.

Particularly, in the present embodiment, the control signal processing unit 140 receives Downlink Control Information (DCI) from the radio communication node 100A. In the NR, similar to the LTE, a downlink data channel or an uplink data channel is scheduled based on the DCI. Moreover, in the NR, DCI for functions other than scheduling such as notifying configuration information of part of the slots that constitute the radio frame via the DCI is also stipulated.

Figure 4A:
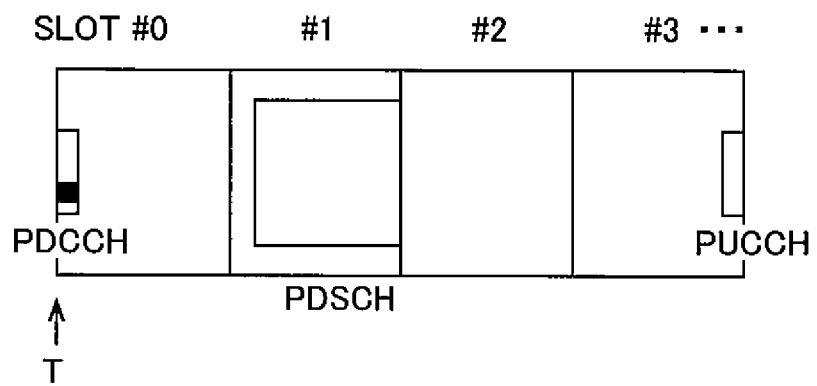
FIG. 4A shows a configuration example of part of slots that constitute a radio frame.
Figure 4B:
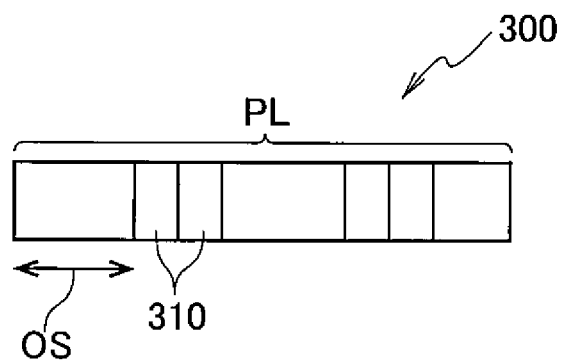
FIG. 4B shows a configuration example of DCI.

FIG. 4A shows a configuration example of part of the slots that constitute the radio frame, and FIG. 4B shows a configuration example of the DCI.

As shown in FIG. 4A, the radio frame is constituted by a plurality of the slots, and the downlink control channel (PDCCH: Physical Downlink Control Channel) and the downlink data channel (PDSCH: Physical Downlink Shared Channel) transmit by using the corresponding slot.

Moreover, as shown in FIG. 4B, radio resource allocation and the like are realized based on a field 310 included in a payload PL of the DCI 300. Particularly, in the present embodiment, the DCI 300 corresponds to DCI that stipulates regarding a group of slot formats (SF) on the radio frame.

The child node receives the DCI 300 via PDCCH, decodes the DCI 300, and receives, based on the decoded DCI 300, a data signal via the PDSCH.

As explained above, in the IAB, the radio resource used by the IAB node (specifically, the DU) are available for the radio access and the radio backhaul; however, such radio resources, specifically, downlink (DL), uplink (UL) and Flexible time-resources belong to a category of either hard resources or soft resources.

A "hard" resource is a radio resource that is always available for the DU child link (equivalent to the radio access link L2 in the present embodiment) that connects the corresponding time resource to the child node or UE, and a "soft" resource is a radio resource for which the availability thereof for DU child link of the corresponding time resource is explicitly or implicitly controlled by the parent node.

Furthermore, in an instruction of such a radio resource (can be called a soft resource) that corresponds to the "soft" category in the IAB, the existing DCI format stipulated in the NR can be used, or a new DCI format can be stipulated.

As an existing DCI format, DCI format 2_0 that stipulates regarding group of slot formats (SF) on the radio frame can be used. Availability of a radio resource that corresponds to the "soft" category can be indicated by the DCI that notifies of such a slot format.

In such a manner, the control signal processing unit 140 receives the downlink control information (DCI). Particularly, the control signal processing unit 140 receives the control information of the DU child link (radio access link L2) included in the DCI (existing or new). Alternatively, the DU child link can simply be called a downlink or a radio access link. In the present embodiment, the control signal processing unit 140 constitutes a receiving unit.

Moreover, the control signal processing unit 140 receives signaling that includes information of the radio resource available for the DU child link. Furthermore, the control signal processing unit 140 receives an offset OS (see FIG. 4B) from a reception timing T of the control information in the slots (see FIG. 4A) on the radio frame.

Specifically, the control signal processing unit 140 can receive the offset OS that is notified via the signaling performed via a layer that is above than that of the transmission of the control information. The control information (DCI) is transmitted and received via layer 1, 2; however, the information of the radio resource available for the DU child link and the offset OS can be notified via an layer above layer 1 and 2, for example, via a radio resource control layer (RRC) signaling.

Alternatively, the control signal processing unit 140 can receive the control information that includes the offset OS. Specifically, as shown in FIGS. 4A and 4B, the offset OS value in a time direction from the reception timing T in the slot on the radio frame of the DCI 300 can be included in any of the fields 310 of the DCI 300.

Alternatively, the offset OS value can be shown by number of bits, number of slots, or time.

The encoding-decoding unit 150 performs data division/linking, channel encoding and decoding, and the like for each predetermined communication destination (radio communication node 100A or UE 200).

Specifically, the encoding-decoding unit 150 divides the data output from the data transmitting-receiving unit 160 into a predetermined size, and performs channel coding on the divided data. Moreover, the encoding-decoding unit 150 decodes the data output from the modulation-demodulation unit 130 and links the decoded data.

The data transmitting-receiving unit 160 performs transmission and reception of Protocol Data Unit (PDU) and Service Data Unit (SDU). Specifically, the data transmitting-receiving unit 160 performs assembly/disassembly of the PDU and the SDU in a plurality of layers (a medium access control layer (MAC), a radio link control layer (RLC), a packet data convergence protocol layer (PDCP), and the like).

The network IF unit 170 realizes an interface that realizes connection with an entity that constitutes a not shown NGC. Specifically, the network IF unit 170 provides a network interface that terminates wired transmission paths of the fiber transport and the like, and performs communication via the network interface.

The controlling unit 180 controls various functional blocks that constitute the radio communication node 100B. Particularly, in the present embodiment, the controlling unit 180 determines a radio resource used for the DU child link (radio access link L2) based on the reception of the DCI 300.

Specifically, the controlling unit 180 determines a location that indicates the radio resource available for the DU child link, based on the reception timing T of the DCI 300 in the slot (see FIG. 4A) on the radio frame.

More specifically, the controlling unit 180 determines a slot (starting slot) from which indication of the radio resource available for the DU child link on the radio frame starts, based on the reception timing T at which the DCI 300 is received by the radio communication node 100B. However, as long as the slot indicates the radio resource available for the DU child link, the slot need not necessarily be the starting slot and can be an end slot or a slot in the middle.

Furthermore, the reception timing T of the DCI 300 can be a timing at which the control signal processing unit 140 detected a first part of the DCI 300, or can be a timing at which reception of the entire DCI 300 is completed.

Alternatively, the controlling unit 180 can determine the starting location (specifically, the starting slot) from which the indication of the radio resources starts, based on the offset OS (see FIG. 4B) from the reception timing T of such DCI 300.

In other words, the controlling unit 180 can determine an offset volume from the reception timing T of the DCI 300 by using the value of the offset OS (number of bits, number of slots, or time) and determine that the radio resource is indicated from a location (slot) that is shifted in accordance with the offset volume.

Moreover, the controlling unit 180 determines the slot on the radio frame that indicate the radio resource, based on the signaling that indicates information of the radio resource available for the DU child link (radio access link L2). Specifically, the controlling unit 180 determines the number of slots on the radio frame that indicates the radio resource based on the RRC layer signaling. For example, the number of slots can be indicated by the number of slotFormats included in slotFormatCombination (see 3GPP TS38.213, TS38.331).

Specifically, the controlling unit 180 determines the number of slots on the radio frame that indicates the radio resource available for the DU child link (see FIG. 4A) based on contents of the signaling.

Moreover, the controlling unit 180 can determine the slots based on the DCI 300 and the monitoring periodicity of the downlink control channel.

Specifically, the controlling unit 180 can determine the slots based on the DCI 300 format type, length (number of slots or time length), or the relation between whether the DCI 300 is received (including whether the reception of the DCI 300 was continuous) and the PDCCH monitoring periodicity.

Typically, depending on whether the PDCCH monitoring periodicity is longer or shorter than the DCI 300 length (number of slots or time length), the controlling unit 180 determines the slot that assumedly indicates the radio resource available for the DU child link.

Moreover, the controlling unit 180 can determine the number of slots, based on a predetermined setting pattern of the radio resource available for the DU child link. Alternatively, instead of determining the number of slots, the controlling unit 180 can determine the number of radio resources available for the DU child link based on the predetermined setting pattern of the radio resource available for the DU child link.

Specifically, as the setting pattern, for example, when the radio resource available for the DU child link is indicated by a bitmap in the DCI 300, a pattern can be set in which the number of radio resources that correspond to the "soft" category can be configured as Semi-static, based on the number of slots that indicate the radio resources available for the DU child link. More specifically, the parent node (IAB donor node) and the child node (IAB node) stores in advance a setting pattern that associates the number of slots with the number of radio resources, and determines the radio resource that corresponds to the "soft" category based on the setting pattern.

Moreover, the controlling unit 180 can determine the number of slots that indicate the radio resource available for the DU child link based on the payload PL (see FIG. 4B) of the DCI 300. Specifically, the controlling unit 180 can determine the number of slots based on the size of the payload PL, more precisely, the length of the payload PL or number of the fields 310 of the DCI 300.

Furthermore, when the length of the payload PL of the DCI 300 that is repetitively received within a predetermined time is not fixed, the controlling unit 180 can determine the number of slots based on an average value of a plurality of the received payloads PL, a longest value, or a shortest value among those.

(3) Operation of Radio Communication System

Operation of the radio communication system 10 is explained below. Specifically, an operation in which a child node (IAB node) determines a location on the radio frame that indicates a radio resource (soft resource) available for a DU child link (Operation Example 1), and an operation in which the child node (IAB node) determines a slot on the radio frame that indicates a radio resource available for the DU child link (Operation Example 2) will be explained.

(3.1) Operation Example 1

In the present operation example, the location (starting slot) on the radio frame that indicates the radio resource available for the DU child link is determined.

Figure 5:
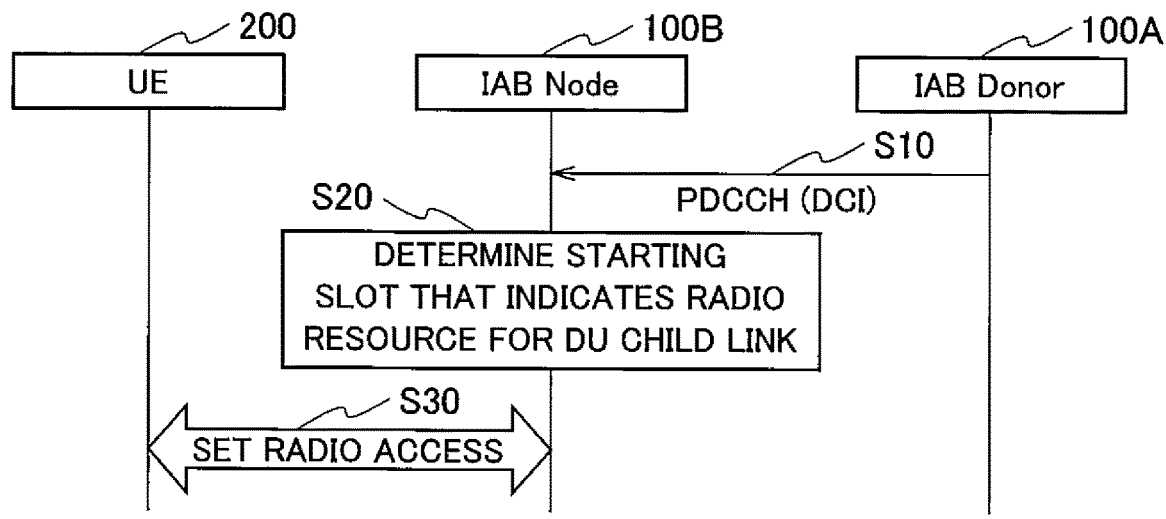
FIG. 5 is a diagram showing a communication sequence that includes process of determining location (starting slot) on a radio frame that indicates a radio resource available for a DU child link.

FIG. 5 shows a communication sequence that includes a process of determining a location (starting slot) on a radio frame that indicates the radio resource available for the DU child link.

As shown in FIG. 5, the radio communication node 100A (IAB donor node/parent node) transmits the DCI 300 (see FIGS. 4A and 4B) via the PDCCH (Step S10).

The radio communication node 100B (IAB node/child node) receives the DCI 300 and determines the location that indicates the radio resource available for the DU child link (Step S20). Specifically, the radio communication node 100B determines the location that indicates the radio resource available for the DU child link, based on the reception timing T (see FIG. 4A) at which the DCI 300 is received.

More specifically, the radio communication node 100B determines a slot (starting slot) from which indication of the radio resource available for the DU child link on the radio frame starts, based on the reception timing T.

As explained above, a DCI format that is similar to the DCI format 2_0 that indicates the slot format (SF) can be used. The slot format indicates which symbol of a part within each slot of the radio frame is available for UL and DL. Each slot format represents a combination of Orthogonal Frequency Division Multiplex (OFDM) symbols that are indicated as DL, Flexible-time resource, and UL, respectively.

Moreover, as explained above, by introducing the offset OS (see FIG. 4B), it can be configured so that difference between a slot in which the radio communication node 100B detects reception of the DCI 300 and a slot from which the indication of the radio resource available for the DU child link starts can be judged.

The offset OS can be notified via signaling of the upper layer (for example, RRC), or can be dynamically indicated via the DCI 300. Furthermore, by setting the value of the offset OS as constant to "none" or "zero", it can be configured so that the offset OS cannot be applied.

The radio communication node 100B sets the radio access with the UE 200 by using a radio resource available for the determined DU child link (Step S30). Specifically, the radio communication node 100B transmits the control information that includes the DCI to the UE 200 via the PDCCH. Moreover, the radio communication node 100B receives various types of data via the PDSCH configured based on the control information.

(3.2) Operation Example 2

In the present operation example, a slot on the radio frame that indicates the radio resource available for the DU child link is determined. Steps that are different from that of the sequence explained in Operation Example 1 will be mainly explained below.

Figure 6:
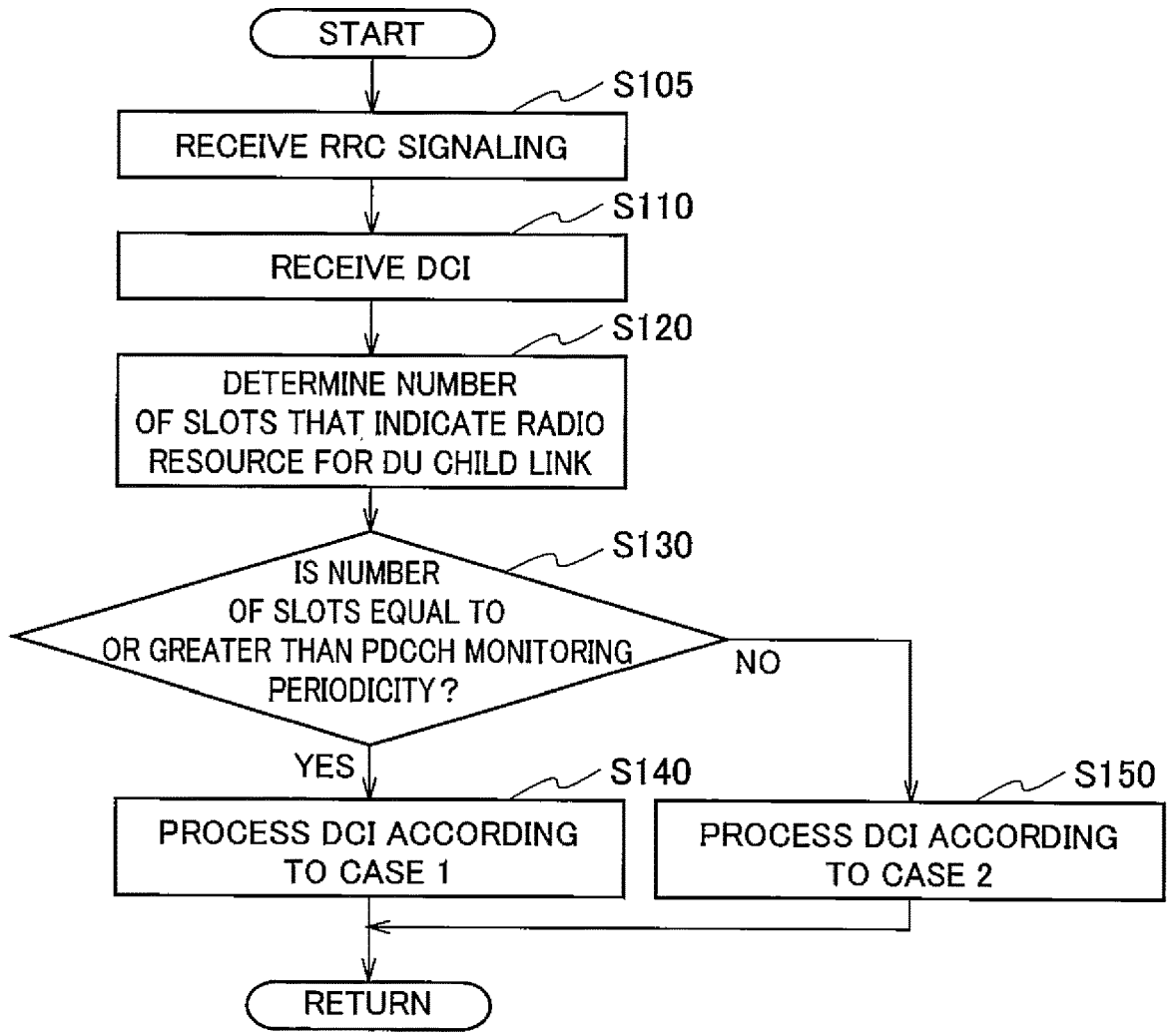
FIG. 6 is a diagram showing an operation flow for determining a slot on the radio frame that indicates the radio resource available for the DU child link.

FIG. 6 shows an operation flow for determining the slot on the radio frame that indicates the radio resource available for the DU child link.

As shown in FIG. 6, the radio communication node 100B receives the RRC layer signaling (Step S105). Moreover, the radio communication node 100B receives the DCI 300 (Step S110). Specifically, the radio communication node 100B receives the DCI 300 via the PDCCH. The signaling can include information on the number of slots that indicate the radio resource available for the DU child link and the offset OS.

The number of slots to which the DCI 300 is applicable is determined based on the RRC layer signaling, and whether the information on the radio resource available for the DU child link is notified and the contents of the information are determined based on whether the DCI 300 is transmitted or the contents of the DCI 300.

The radio communication node 100B determines, based on the received signaling of the RRC layer, the number of slots that indicate the radio resource available for the DU child link, in other words, the number of slots on the radio frame that indicates the radio resource available for the DU child link (Step S120).

Specifically, the radio communication node 100B can determine the number of slots on the radio frame that indicates the radio resource available for the DU child link based on any of the following options:

(a) When the DCI format 2_0 is used again to indicate availability of the radio resource for the DU child link, the number of slotFormats (number of slots) included in the slotFormatCombination is indicated within the DCI format 2_0.

(b) When the new DCI format is used to indicate the availability of the radio resource for the DU child link, the number of slots or the number of radio resources (soft resources) is indicated via signaling of the upper layer.

Furthermore, in the case of option (b), as explained above, the number of soft resources can be configured to be semi-static based on the number of slots that indicate the radio resource available for the DU child link, or the number of soft resources can be directly specified. Alternatively, as explained above, the number of soft resources can be determined based on the size of the payload PL (see FIG. 4B) of the DCI 300.

The radio communication node 100B judges whether or not the number of slots having indication of the radio resource available for the determined DU child link is equal to or greater than the PDCCH monitoring periodicity (Step S130).

Specifically, the determined slots are continuous on the radio frame (on the time axis) and are of a predetermined time length. The radio communication node 100B judges whether the time length according to the number of slots is equal to or greater than the PDCCH monitoring periodicity.

Furthermore, the number of slots included in DCI 300 is variable. Therefore, in some cases, the time length according to the number of slots is equal to or greater than the PDCCH monitoring periodicity, and in some cases, the time length according to the number of slots is less than the PDCCH monitoring periodicity.

When the time length according to the number of slots is equal to or greater than the PDCCH monitoring periodicity, the radio communication node 100B executes the processing of the DCI 300 according to Case 1 (Step S140).

On the other hand, when the time length according to the number of slots is less than the PDCCH monitoring periodicity, the radio communication node 100B executes the processing of the DCI 300 according to Case 2 (Step S150).

Hereinafter, the operation of the radio communication node 100B in both cases will be further explained.

(3.2.1) Case 1

As explained above, in Case 1, the time length according to the determined number of slots is equal to or greater than the PDCCH monitoring periodicity. However, handling of the DCI 300 differs depending on whether or not the DCI 300 is received (detected) at the subsequent PDCCH monitoring occasion.

(3.2.1.1) Case 1a

The present case stipulates regarding the operation of the radio communication node 100B executed when the DCI 300 is detected at a first PDCCH monitoring occasion and the DCI 300 is also detected at the subsequent PDCCH monitoring occasion.

Figure 7:
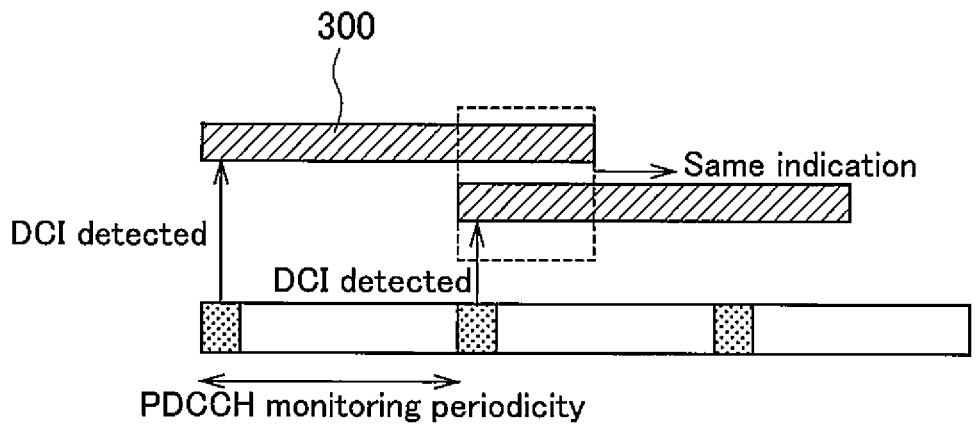
FIG. 7 is a diagram showing an example of processing of DCI 300 executed when the DCI 300 is also detected at a subsequent PDCCH monitoring occasion (Case 1a, Part 1).
Figure 8:
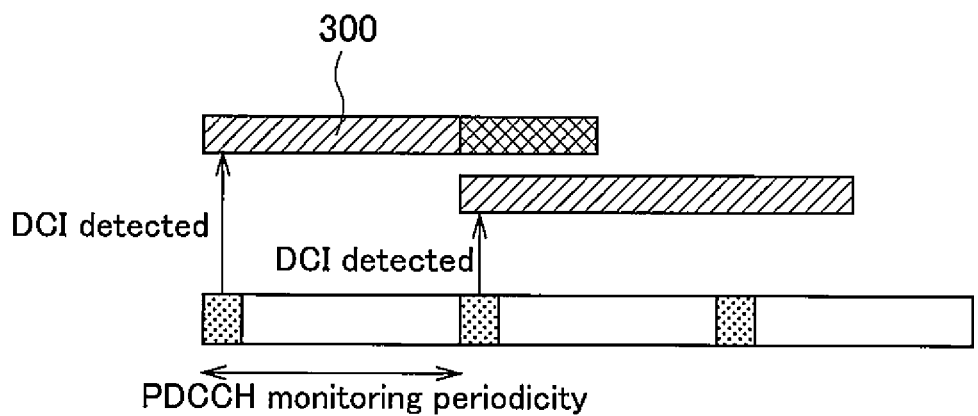
FIG. 8 is a diagram showing an example of the processing of the DCI 300 executed when the DCI 300 is also detected at the subsequent PDCCH monitoring occasion (Case 1a, Part 2).

FIGS. 7 and 8 show an example of the DCI 300 processing executed when the DCI 300 is again detected at the subsequent PDCCH monitoring occasion also (Case 1a).

As shown in FIG. 7, the radio communication node 100B executes the processing of the DCI 300 by anticipating that the DCI 300 detected at the first PDCCH monitoring occasion and the DCI 300 detected at the subsequent PDCCH monitoring occasion indicate the same contents. In other words, it is assumed that the soft resource that is indicated in the DCI 300 detected at the first PDCCH monitoring occasion and the soft resource that is indicated in the DCI 300 detected at the subsequent PDCCH monitoring opportunity are the same.

On the other hand, as shown in FIG. 8, the radio communication node 100B can apply the DCI 300 detected at the subsequent PDCCH monitoring occasion, that is, the soft resource indicated in the latest DCI 300.

(3.2.1.2) Case 1b

In the present case, the operation of the radio communication node 100B executed when the DCI 300 is detected at the first PDCCH monitoring occasion but the DCI 300 cannot be detected at the subsequent PDCCH monitoring occasion is stipulated.

Figure 9:
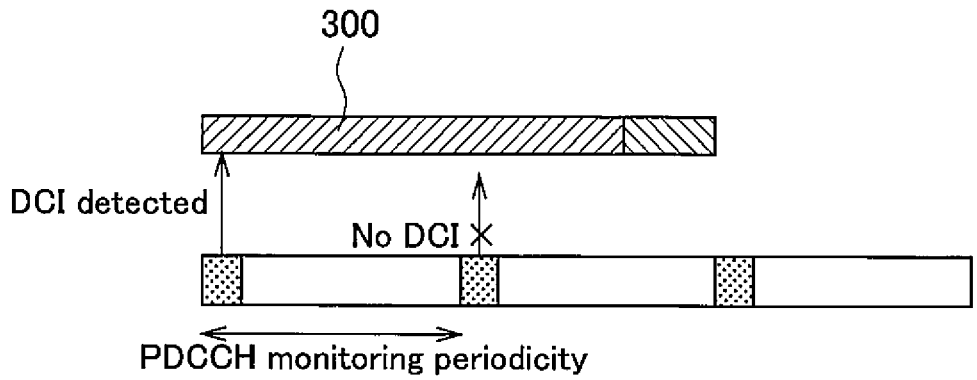
FIG. 9 shows an example of the processing of the DCI 300 executed when the DCI 300 cannot be detected at the subsequent PDCCH monitoring occasion (Case 1b, Part 1).
Figure 9:
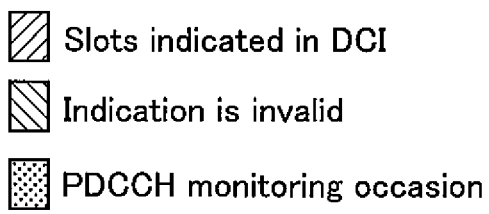
Figure 10:
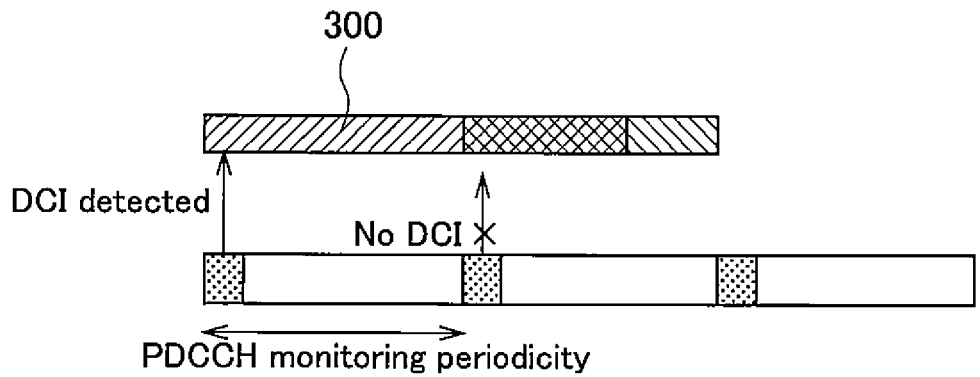
FIG. 10 shows an example of the processing of the DCI 300 executed when the DCI 300 cannot be detected at the subsequent PDCCH monitoring occasion (Case 1b, Part 2).
Figure 10:
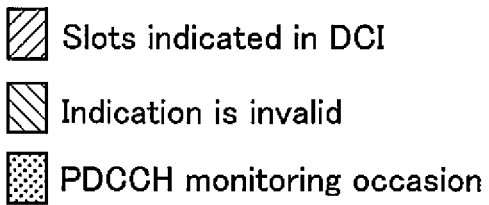

FIGS. 9 and 10 show an example of processing of the DCI 300 executed when the DCI 300 cannot be detected at subsequent monitoring occasion of the PDCCH (Case 1b).

As shown in FIG. 9, when the radio communication node 100B cannot detect the DCI 300 at the subsequent PDCCH monitoring occasion, the radio communication node 100B executes the processing of the DCI 300 by applying the DCI 300 detected at the first PDCCH monitoring occasion to all PDCCH monitoring occasions after the subsequent PDCCH monitoring occasion.

On the other hand, as shown in FIG. 10, when the radio communication node 100B cannot detect the DCI 300 at the subsequent PDCCH monitoring occasion, the radio communication node 100B does not apply the DCI 300 detected at the first PDCCH monitoring occasion to all PDCCH monitoring occasions after the subsequent PDCCH monitoring occasion.

In such a case, the radio communication node 100B determines, the application of the soft resource to all PDCCH monitoring occasions after the subsequent PDCCH monitoring occasion, based on only the signaling via a predetermined layer such as the RRC layer. However, when the DCI 300 is detected at the subsequent PDCCH monitoring occasion, the soft resource indicated by the detected DCI 300 can be applied.

(3.2.2) Case 2

As explained above, Case 2 explains a case in which the time length according to the determined number of slots is shorter than the PDCCH monitoring periodicity, and handling of the DCI 300 differs depending on whether or not the DCI 300 is received (detected) at the subsequent PDCCH monitoring occasion.

Moreover, Case 2 is explained by citing an example of the processing of the DCI 300 executed when the radio communication node 100B assumes that the DCI 300 repetition of the same pattern is applied.

(3.2.2.1) Case 2a

Figure 11:
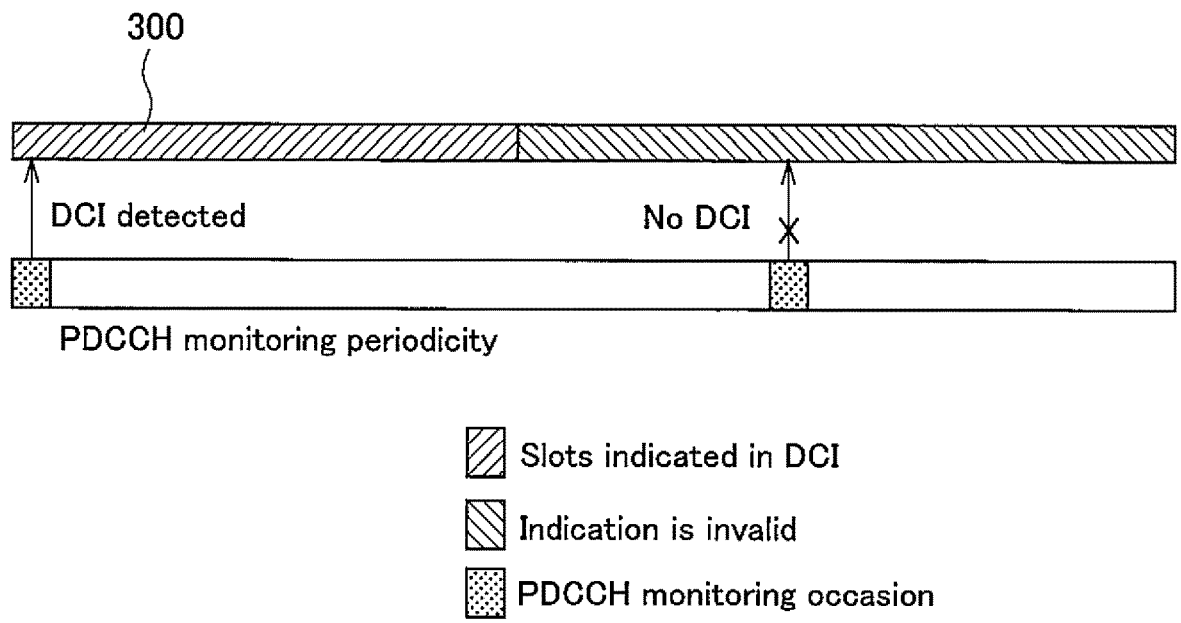
FIG. 11 is a diagram showing an example of the processing of the DCI 300 executed when the DCI 300 cannot be detected at the subsequent PDCCH monitoring occasion (Case 2a).

FIG. 11 shows an example of the processing of the DCI 300 when the DCI 300 cannot be detected at the subsequent PDCCH monitoring occasion (Case 2a).

As shown in FIG. 11, when the time length according to the determined number of slots is less than the PDCCH monitoring periodicity and the DCI 300 cannot be detected at the subsequent PDCCH monitoring occasion, only the determined number of slots ("Slots indicated in DCI" in the figure) are applied as the soft resources.

In other words, the indication in the DCI 300 is handled as invalid for the part in which the number of slots exceeds the determined number.

Figure 12:
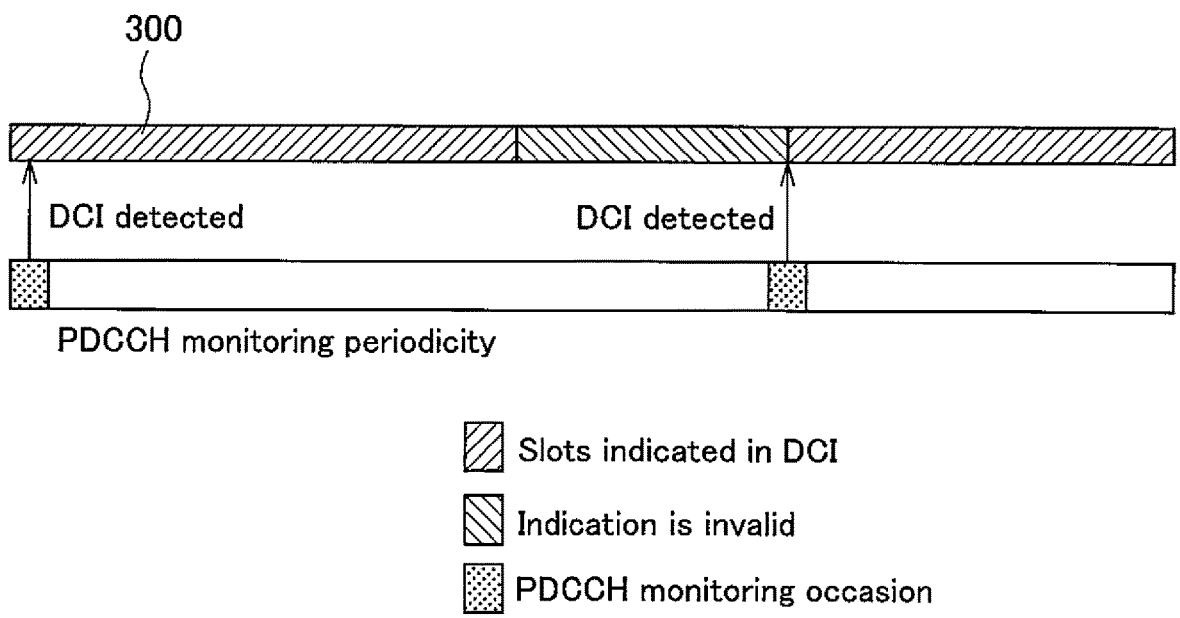
FIG. 12 is a diagram showing an example of the processing of the DCI 300 executed when the DCI 300 is detected at the subsequent PDCCH monitoring occasion (Case 2a).

FIG. 12 shows an example of the processing of the DCI 300 executed when the DCI 300 is detected at the subsequent PDCCH monitoring occasion (Case 2a).

As shown in FIG. 12, when the time length according to the determined number of slots is less than the PDCCH monitoring periodicity, and when the DCI 300 is detected at the subsequent PDCCH monitoring occasion, during a period till the slot indicated in the DCI 300 that is detected at the first PDCCH monitoring occasion ends and the DCI 300 is detected again at the subsequent PDCCH monitoring occasion, the indication in the DCI 300 is handled as invalid.

(3.2.2.2) Case 2b

Figure 13:
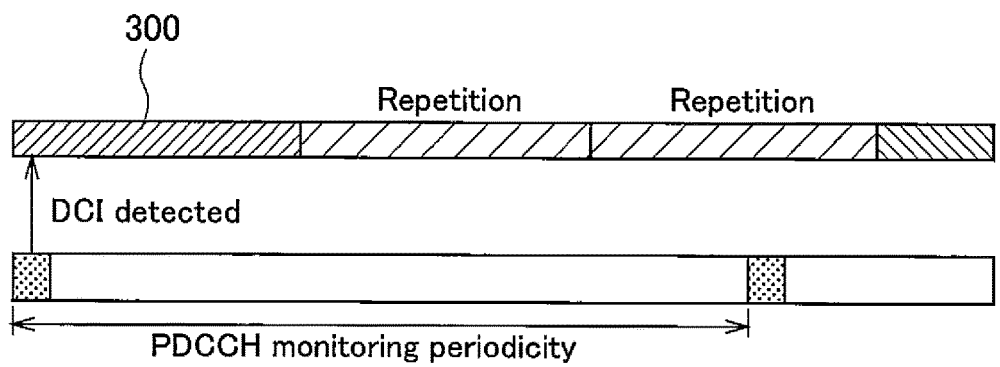
FIG. 13 is a diagram showing an example of the processing of the DCI 300 executed when it is assumed that the DCI 300 repetition of same pattern is applied (Case 2b).

FIG. 13 shows an example of the processing of the DCI 300 executed when it is assumed that the DCI 300 repetition of the same pattern is applied (Case 2b).

As shown in FIG. 13, the radio communication node 100B applies soft resources even for the part by which the number of slots exceeds the determined number by assuming that the DCI 300 repetition of the same pattern is applied.

In such a case, the radio communication node 100B can assume that the DCI 300 repetition continues till the subsequent PDCCH monitoring occasion.

Moreover, a frequency of the DCI 300 repetition can be set by the signaling of the upper layer. For example, in FIG. 13, the frequency of the DCI 300 repetition is three times, however, when the total number of slots according to the DCI 300 repetition exceeds the PDCCH monitoring periodicity, the case can be further distinguished into the following scenarios.

(3.2.2.3) Case 2c

Figure 14:
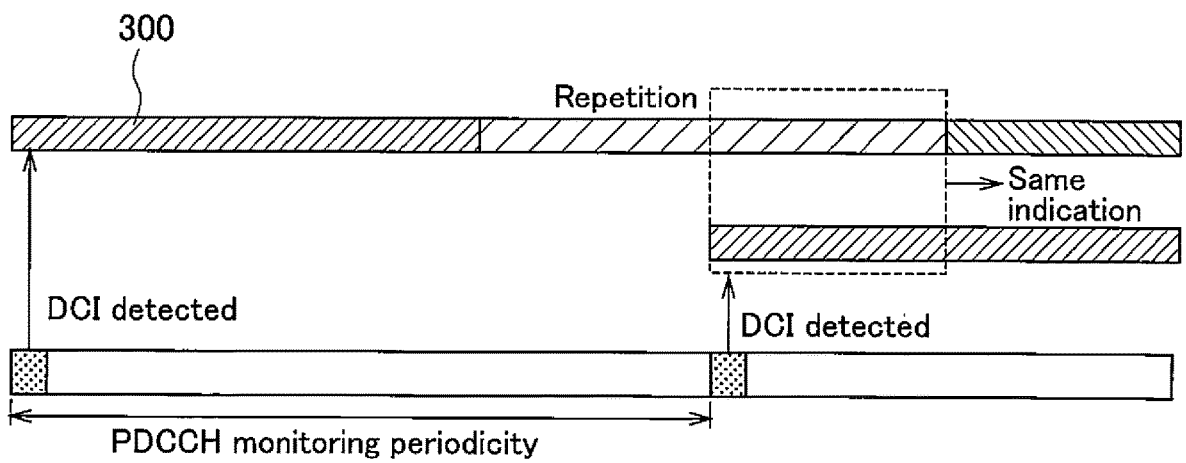
FIG. 14 is a diagram showing an example of the processing of the DCI 300 executed when a total number of slots according to the DCI 300 repetition exceeds a PDCCH monitoring periodicity, and the DCI 300 is detected at the subsequent PDCCH monitoring occasion (Case 2c, Part 1).
Figure 15:
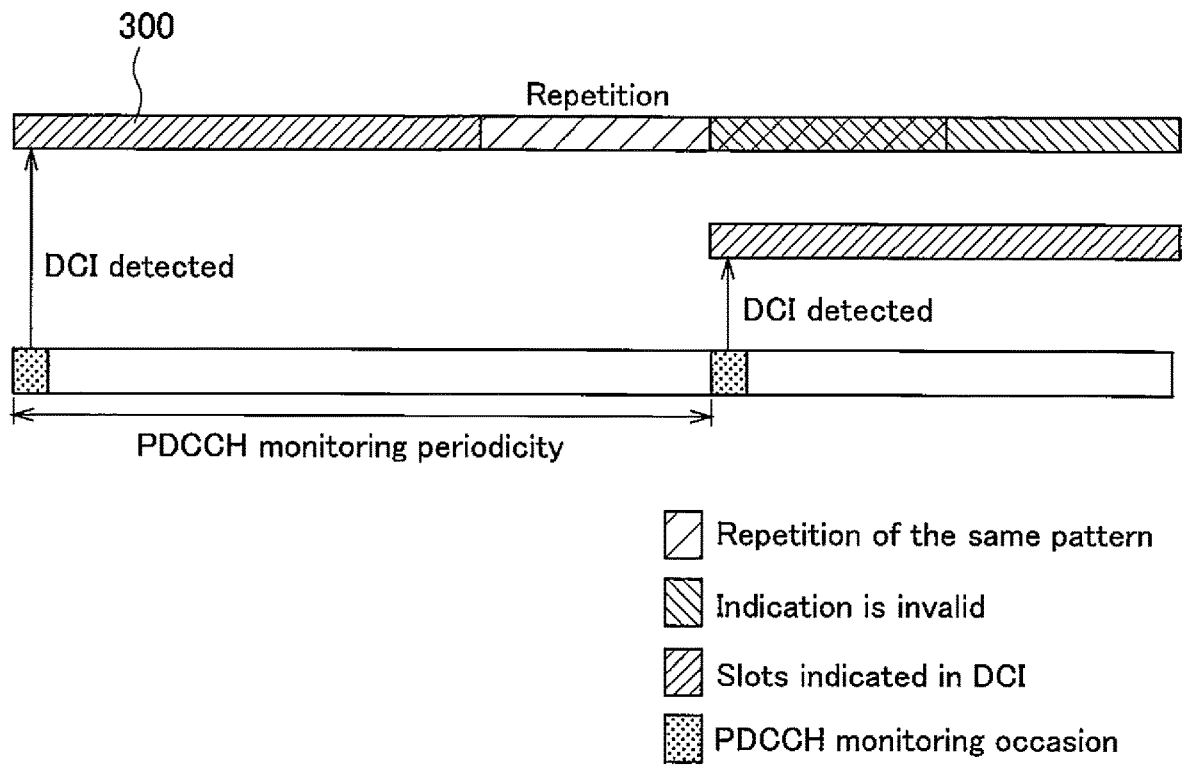
FIG. 15 is a diagram showing an example of the processing of the DCI 300 executed when the total number of slots according to the DCI 300 repetition exceeds the PDCCH monitoring periodicity, and the DCI 300 is detected at the subsequent PDCCH monitoring occasion (Case 2c, Part 2).

FIGS. 14 and 15 show an example of the processing of the DCI 300 executed when the total number of slots according to the DCI 300 repetition exceeds the PDCCH monitoring periodicity, and the DCI 300 is detected at the subsequent PDCCH monitoring occasion (Case 2c).

In such a case, the radio communication node 100B operates in the same manner as that in Case 1a explained above. Specifically, as shown in FIG. 14, the radio communication node 100B executes the processing of the DCI 300 by anticipating that slots according to the DCI 300 repetition and the DCI 300 detected at the subsequent PDCCH monitoring occasion indicate the same contents.

On the other hand, as shown in FIG. 15, the radio communication node 100B can apply the DCI 300 detected at the subsequent PDCCH monitoring occasion, that is, a soft resource indicated in the latest DCI 300.

Furthermore, the setting of the DCI 300 repetition can be considered another method for Operation Example 1 explained above, that is, another method to determine location (starting slot) on the radio frame that indicates the radio resource available for the DU child link. Alternatively, setting of the DCI 300 repetition can be considered as an additional operation to be executed after processes of Operation Example 1 are executed.

(3.2.2.3) Case 2d

Figure 16:
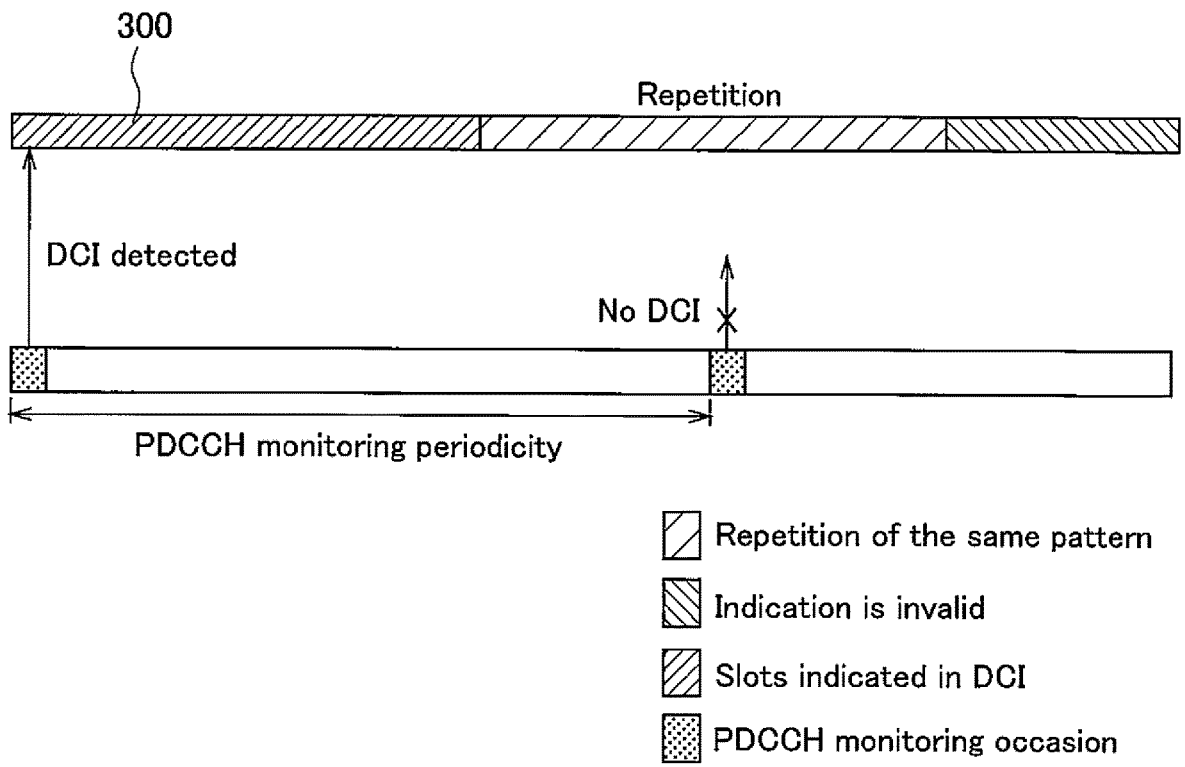
FIG. 16 is a diagram showing an example of the processing of the DCI 300 executed when the total number of slots according to the DCI 300 repetition exceeds the PDCCH monitoring periodicity, and the DCI 300 cannot be detected at the subsequent PDCCH monitoring occasion (Case 2d, Part 1).
Figure 17:
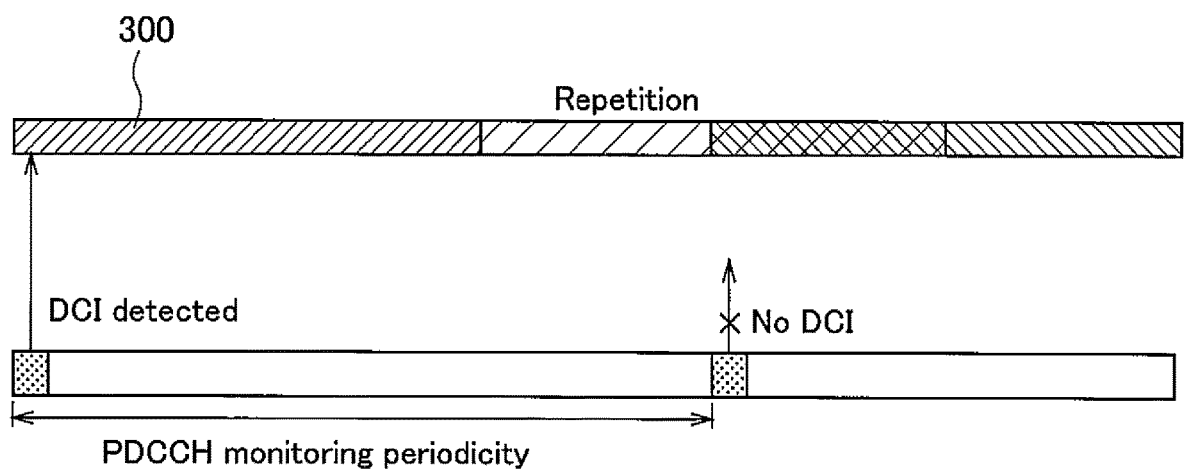
FIG. 17 is a diagram showing an example of the processing of the DCI 300 executed when the total number of slots according to the DCI 300 repetition exceeds the PDCCH monitoring periodicity, and the DCI 300 cannot be detected at the subsequent PDCCH monitoring occasion (Case 2d, Part 2).

FIGS. 16 and 17 show an example of the processing of the DCI 300 executed when the total number of slots according to the DCI 300 repetition exceeds the PDCCH monitoring periodicity, and the DCI 300 cannot be detected at the subsequent PDCCH monitoring occasion (Case 2d).

In such a case, the radio communication node 100B operates in the same manner as that in Case 1b explained above. Specifically, as shown in FIG. 16, when the DCI 300 cannot be detected at the subsequent PDCCH monitoring occasion, the radio communication node 100B executes the processing of the DCI 300 by applying the DCI 300 according to the DCI 300 repetition to all PDCCH monitoring occasions after the subsequent PDCCH monitoring occasion.

On the other hand, as shown in FIG. 17, when the DCI 300 cannot be detected at the subsequent PDCCH monitoring occasion, the radio communication node 100B does not apply the DCI 300 according to the DCI 300 repetition to all PDCCH monitoring occasions after the subsequent PDCCH monitoring occasion.

(4) Effects and Advantages

The following operational effects can be obtained with the embodiments explained above. Specifically, according to the radio communication system 10, the radio communication node 100B (the same is applicable to the radio communication node 100A and the radio communication node 100C; hereinafter the same) can determine the location that indicates a radio resource available for DU child link (radio access link L2) based on the reception timing T of the DCI 300 in the slot on the radio frame (see Operation Example 1).

Moreover, the radio communication node 100B can determine a slot on the radio frame based on the signaling (signaling of RRC layer) that includes the radio resource available for the DU child link (radio access link L2) (see Operation Example 2).

Accordingly, even when IAB configuration is used and there is a restriction of half duplex communication, the radio communication node 100B can reliably set up the radio access or the radio backhaul based on the DCI 300 received from the parent node (radio communication node 100A). In other words, according to the radio communication system 10, even when the radio resource available for the DU child link is being explicitly or implicitly controlled by the parent node and changes dynamically, the radio communication node 100B can set the radio access or the radio backhaul by using an appropriate radio resource.

Particularly, according to the present embodiment, because a configuration similar to an existing DCI format, specifically, DCI format 2_0 that stipulates regarding groups of slot formats can be used, stipulation of a new format and detection mechanism of radio resources available for the DU child link is not necessary.

In the present embodiment, location that indicates a radio resource available for the DU child link can be determined based on the offset OS (see FIG. 4B) from the reception timing T of the DCI 300. Accordingly, depending on the availability of the radio resources in the radio communication system 10 and the like, location of the radio resource available for the DU child link can be easily changed.

Furthermore, in the present embodiment, the offset OS can be explicitly included in the signaling of an upper layer, or the DCI 300. Accordingly, the offset OS can be easily and reliably notified to the IAB node.

In the present embodiment, the radio communication node 100B can determine a slot that indicates a radio resource available for the DU child link based on the DCI 300 and the PDCCH monitoring periodicity. Therefore, even when the time length according to the determined number of slots is equal to or greater than the PDCCH monitoring periodicity, or is less than the PDCCH monitoring periodicity, the radio communication node 100B can appropriately determine the radio resource available for the DU child link.

Furthermore in the present embodiment, the radio communication node 100B can determine a slot or the number of radio resources available for the DU child link based on a predetermined configuration pattern of the radio resources available for the DU child link. Accordingly, by using the configuration pattern, degree of freedom at the time of determining the number of slots or the number of radio resources available for the DU child link can be increased.

Moreover, in the present embodiment, the radio communication node 100B can determine the number of slots that indicate the radio resource available for the DU child link based on the payload PL, specifically, the size of the DCI 300 (see FIG. 4B). Accordingly, the radio communication node 100B can determine a slot that indicates the radio resource that is effectively available for the DU child link based on the effective size of the DCI 300.

(5) Other Embodiments

Although the contents of the present invention have been described by way of the embodiments, it is obvious to those skilled in the art that the present invention is not limited to what is written here and that various modifications and improvements thereof are possible.

For example, in the embodiments explained above, a method to determine location and the number of slots in a radio frame that indicate the radio resource available for the DU child link, specifically, the radio access link L2. However, the same method of determination can be applied to the radio backhaul link L1. Furthermore, in the embodiments explained above, details on a soft resource, which is a radio resource for which availability for the DU child link is explicitly or implicitly controlled by a parent node is explained. However, the same method can be applied as long as control information states whether the resource availability is controlled by the parent node explicitly or implicitly.

In the embodiments explained above, Operation Examples 1 and 2 are explained separately, however, the child node (IAB node) can be executed by integrating both the operation examples.

Moreover, in the embodiments explained above, the slot that indicates the radio resource available for DU child link is determined based on the PDCCH monitoring periodicity by assuming that the DCI 300 is transmitted via the PDCCH. However, the DCI 300 can be transmitted via a channel (control channel) other than the PDCCH.

Alternatively, instead of the DCI, control information of the DU child link can be notified to the child node (IAB node) as any other control information.

Moreover, the block diagram used for explaining the embodiments (FIG. 3) shows blocks of functional unit. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that causes transmitting may be called a transmitting unit or a transmitter. For any of the above, as explained above, the realization method is not particularly limited to any one method.

Figure 18:
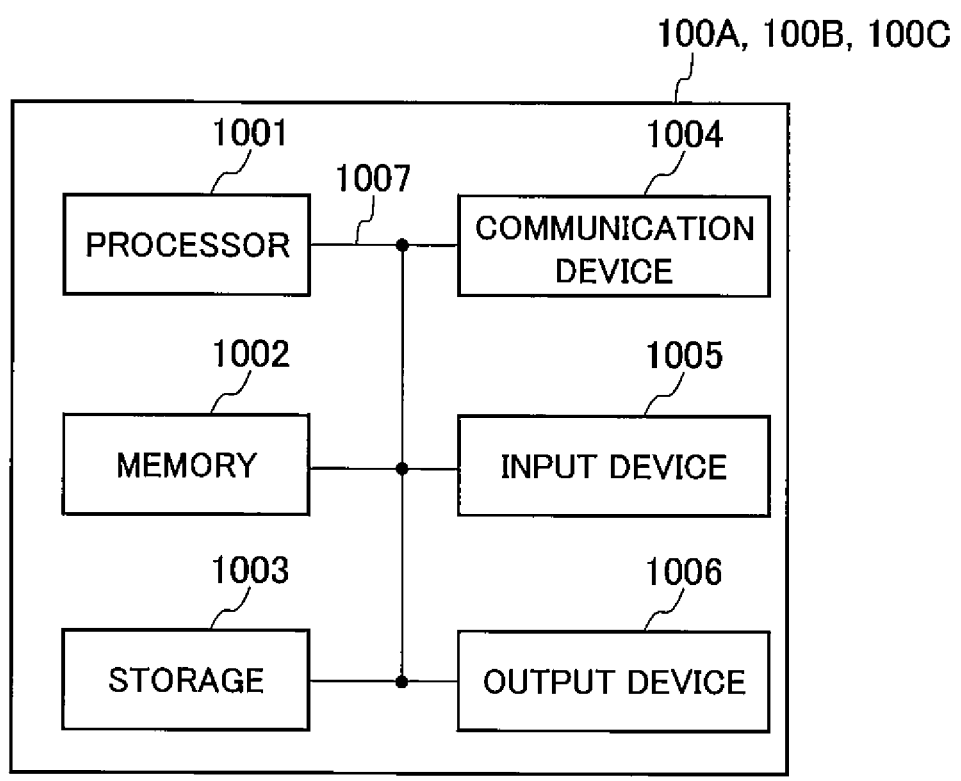
FIG. 18 is a diagram showing an example of hardware configuration of the radio communication nodes 100A, 100B, and 100C.

Furthermore, the radio communication nodes 100A, 100B, and 100C (device) explained above can function as a computer that performs the processing of the radio communication method of the present disclosure. FIG. 18 is a diagram showing an example of a hardware configuration of the device. As shown in FIG. 18, the device can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

The functional blocks of the device (see FIG. 3) can be realized by any of hardware elements of the computer device or a desired combination of the hardware elements.

Moreover, the processor 1001 performs computing by loading a predetermined software (computer program) on hardware such as the processor 1001 and the memory 1002, and realizes various functions of the device by controlling communication via the communication device 1004, and controlling reading and/or writing of data on the memory 1002 and the storage 1003.

The processor 1001, for example, operates an operating system to control the entire computer. The processor 1001 can be configured with a central processing unit (CPU) including an interface with a peripheral device, a control device, a computing device, a register, and the like.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 can be called register, cache, main memory (main memory), and the like. The memory 1002 can store therein a computer program (computer program codes), software modules, and the like that can execute the method according to the embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Notification of information is not limited to that explained in the above aspect/embodiment, and may be performed by using a different method. For example, the notification of information may be performed by physical layer signaling (for example, Downlink Control Information (DCI), Uplink Control Information (UCI), upper layer signaling (for example, RRC signaling, Medium Access Control (MAC) signaling, notification information (Master Information Block (MIB), System Information Block (SIB)), other signals, or a combination of these. The RRC signaling may be called RRC message, for example, or can be RRC Connection Setup message, RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, UltraMobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information, signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of a channel and a symbol may be a signal (signaling). Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same). For example, each of the aspects/embodiments of the present disclosure may be applied to a configuration that allows a communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms an uplink channel, a downlink channel, or the like may be read as a side channel.

Likewise, a mobile station in the present disclosure may be read as a base station. In this case, the base station may have the function of the mobile station.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 Radio communication system
100A, 100B, 100C Radio communication node
110 Radio signal transmission and reception unit
120 Amplifier unit
130 Modulation-demodulation unit
140 Control signal processing unit
150 Encoding-decoding unit
160 Data transmitting-receiving unit
170 Network IF unit
180 Controlling unit
200 UE
300 DCI
310 Field
L1 Radio backhaul link
L2 Radio access link
OS Offset
PL Payload
T Reception timing
1001 Processor
1002 Memory
1003 Storage
1004 Communication device
1005 Input device
1006 Output device
1007 Bus

The invention claimed is:

1. A radio communication node that has a first radio link with a parent node and a second radio link with a child node, comprising:
 a receiving unit that receives first downlink control information (first DCI) indicating resource availability in the second radio link, from the parent node using the first radio link, via a first physical downlink control channel (PDCCH); and
 a controlling unit that assumes that content of resource availability in the second radio link indicated by a second DCI in a second PDCCH received next after the first PDCCH is the same as content of the resource availability indicated by the first DCI, when a number of slots in which the resource availability indicated by the first DCI is applied is larger than a PDCCH monitoring period.

2. The radio communication node according to claim 1, wherein the receiving unit receives a third DCI indicating a group of slot formats on a radio frame, and a DCI format in the first DCI and second DCI is different from a DCI format in the third DCI.

3. The radio communication node according to claim 1, wherein the receiving unit receives a radio resource control layer signaling (RRC signaling) including information relating to the number of slots in which the resource availability in the second radio link is applied, and the controlling unit decides the number of slots in which the resource availability in the second radio link is applied, based on the RRC signaling, the first DCI, and the second DCI.

4. The radio communication node according to claim 2, wherein the receiving unit receives a radio resource control layer signaling (RRC signaling) including information relating to the number of slots in which the resource availability in the second radio link is applied, and the controlling unit decides the number of slots in which the resource availability in the second radio link is applied, based on the RRC signaling, the first DCI, and the second DCI.

5. A communication method of a radio communication node that has a first radio link with a parent node and a second radio link with a child node, comprising:
receiving first downlink control information (first DCI) indicating resource availability in the second radio link, from the parent node using the first radio link, via a first physical downlink control channel (PDCCH); and
assuming that content of resource availability in the second radio link indicated by a second DCI in a second PDCCH received next after the first PDCCH is the same as content of the resource availability indicated by the first DCI, when a number of slots in which the resource availability indicated by the first DCI is applied is larger than a PDCCH monitoring period.

* * * * *